Patented July 18, 1944

2,354,077

UNITED STATES PATENT OFFICE 2,354,077

PROCESS FOR PRODUCING FILAMENTS, THREADS, FIBERS, BANDS, FILMS, AND THE LIKE FROM PROTEINS

Lambertus Alexander van Bergen, Aarle-Rixtel, Netherlands; vested in the Alien Property Custodian No Drawing. Application May 11, 1940, Serial No. 334,656. In the Netherlands May 11, 1939

6 Claims. (Cl. 18—54)

This invention relates to the production of filaments, threads, fibers, bands, films and the like by extrusion of a solution of protein, particularly casein in alkali into a coagulating bath, wherein the coagulated product is hardened by treatment with a hardening agent reacting with the amino groups of the protein.

It is known that proteins, particularly casein, can be made insoluble and water-resistant by subjecting them to a treatment with substances reacting with the amino groups, e. g. methanal. The role of the carboxylic groups also present in the protein complex and to which the property of binding metal ions is attributed, whereby the hydration or solubility should be influenced, is not completely clear. Therefore it is comprehensible that attempts have been made to improve the properties of the protein products as to durability and water-resistance by neutralisation of these groups. For this purpose salts of bivalent and polyvalent metals, e. g. salts of barium and calcium, were added to the protein. Also aluminum sulphate and alums were used.

In applying these salts attention has mainly been paid to the positive ion and little or no attention to the negative ion. According to my invention it has appeared that the formate ion exercises a very specific action, particularly aluminium formate, alone or in combination with other formates. For instance conditions being otherwise equal casein fibers hardened at 30° C. during 6 hours in a bath containing 2% methanal, 10% sulphate of sodium and 5% sulphate of aluminium, will not be hardened to such a degree that they are resistant to boiling in water, whereas fibers hardened in a bath containing 2% methanal, 10% formate of sodium and 6.3% of aluminium triformate containing water of crystallization show even after only 1 hour a good resistance to boiling though both baths contain an equal amount of aluminium.

The specific action of this formate is not in the least clear, particularly when realizing that it is also possible that the effect stated has to be attributed to the occurrence of complex compounds, e. g. aluminium triformate

$$\{Al(OOCH_3)_3(H_2O)_3\}$$

the possibility of which occurrence can be supposed in all solutions in which the formate ion is present together with the aluminium ion, regardless of whether or not other positive and/or negative ions are also present.

I have further found that the composition of the baths can differ very substantially and that the hardening agents may act separately or that their action can take place stepwise. It is also possible to use other salts together with the formates or to form the formates in the baths. There have to be present, however, one or more positive ions of polyvalent metals, preferably aluminium, if desired together with those of univalent metals, and as the negative ion the formate, if desired together with other ions or even organic substances.

I have also found that hardening baths according to the invention can be obtained by using formate-containing coagulating baths and bringing the products extruded therein into the formate-containing hardening baths without washing. It is also within the scope of my invention to bring the products from coagulating baths containing salts of polyvalent metals immediately i. e. without washing into formate-containing hardening baths.

U. S. application Serial No. 314,880 discloses that in determining the alkali content of a solution of protein in alkali, it has to be taken into account that a part of the alkali used for dissolving the protein is bound by the protein so that only the free alkali present in the solution determines the alkalinity of the solution.

I have now found further also that the use of formates in the hardening of fibers, threads, films and the like produced from solutions of protein in alkali, is important for the strength of these products, particularly the strength in wet condition, when they are obtained by extrusion of protein solutions having such an alkali content that at most 0.4 mol of free alkali per kg. protein is present, or even such an alkali content that there is a deficiency of alkali bound by the protein.

The significance of this influence of the hardening in the presence of formates is clearly shown by the following table, which relates to a casein solution of 16%, so that 0.2% free NaOH corresponds to approximately 0.3 mol free NaOH per kg. of protein.

| Per cent free NaOH | 0.5 | 0.3 | 0.2 | 0.1 | 0.0 |
|---|---|---|---|---|---|
| Strength in wet condition calculated per 100 deniers in case of: | | | | | |
| Sulphate hardening | 18 | 20 | 22 | 27 | 27 |
| Formate hardening | 18 | 23 | 26 | 29 | 31 |
| Deficiency of bound NaOH in per cent | 0.1 | 0.2 | 0.3 | | |
| Strength in wet condition calculated per 100 deniers in case of: | | | | | |
| Sulphate hardening | 28 | 28 | 28 | | |
| Formate hardening | 32 | 35 | 34 | | |

Various changes may be made in the details disclosed in the foregoing specification without departing from the invention or sacrificing the advantages thereof.

I claim:

1. A process for the production of filaments, threads, fibers, bands, films and the like having a high resistance to boiling which comprises extruding a solution of a protein in alkali into a coagulating bath, and hardening the resultant product by treatment with an aldehyde and with a solution containing as essential ingredients formate ions and polyvalent metal ions, said protein solution containing at most 0.4 mol of free alkali per kg. of protein.

2. A process for the production of filaments, threads, fibers, bands, films and the like having a high resistance to boiling which comprises extruding a solution of a protein in alkali into a coagulating bath, and hardening the resultant product by treatment with at least one aldehyde, and with a solution containing as essential ingredients at least one substance in dissolved condition selected from the group consisting of the formates of polyvalent metals, and at least one substance in dissolved condition selected from the group consisting of the formates of univalent metals, said protein solution containing at most 0.4 mol of free alkali per kg. of protein.

3. A process for the production of filaments, threads, fibers, bands, films and the like having a high resistance to boiling which comprises extruding a solution of a protein in alkali into a coagulating bath, and hardening the resultant product by treatment with at least one aldehyde, and with a solution containing as essential ingredients at least one formate ion-yielding salt in dissolved condition, and at least one additional polyvalent metal ion-yielding salt in dissolved condition, said protein solution containing at most 0.4 mol of free alkali per kg. of protein.

4. A solution for use in hardening the products obtained by extruding a solution of a protein in alkali into a coagulating bath, said hardening solution containing as essential ingredients at least one formate of a polyvalent metal and at least one formate of a univalent metal.

5. A solution for use in hardening the products obtained by extruding a solution of a protein in alkali into a coagulating bath, said hardening solution containing as essential ingredients methanal, sodium formate and aluminum triformate.

6. A solution for use in hardening the products obtained by extruding a solution of a protein in alkali into a coagulating bath, said hardening solution containing as essential ingredients 2% methanal, 10% sodium formate and 6.3% aluminum triformate.

LAMBERTUS ALEXANDER van BERGEN.